United States Patent Office 2,991,277
Patented July 4, 1961

---

2,991,277
COPOLYMERS OF TRIFLUOROETHYL VINYL ETHER AND ALKYL ESTERS OF ACRYLIC OR METHACRYLIC ACID, AND METHOD FOR PREPARING SAME
Calvin E. Schildknecht, Montclair, N.J., assignor to Air Reduction Company, Incorporated, New York, N.Y., a corporation of New York
No Drawing. Filed June 10, 1955, Ser. No. 514,790
10 Claims. (Cl. 260—86.1)

This invention relates to polymeric materials and methods of preparing same. More particularly this invention is concerned with copolymers of 2,2,2-trifluoroethyl vinyl ether and an ester of acrylic acid and its homologues.

Other copolymers of 2,2,2-trifluoroethyl vinyl ether are described in my copending related applications, Serial Number 514,789, filed June 10, 1955, now Patent No. 2,851,449, and Serial Number 514,791, filed June 10, 1955.

Many homopolymeric materials, and in particular the homopolymers of esters of acrylic and methacrylic acids, lack the pliability, abrasion resistance, and impact resistance desirable in flexible films and plastics. They require, for most uses as films, the addition of other softening substances to make them more flexible or plastic. This "plasticization" has been accomplished either by the addition, after homopolymerization, of a variety of materials, referred to as external plasticizers, or by copolymerization with other monomers, which are referred to as internal plasticizers. A number of difficulties have been encountered with external plasticization. For example, since the external plasticizer is present merely in physical admixture with the polymer, the external plasticizer is subject to migration, extraction or exudation from the films. The internal plasticizing monomers employed heretofore while improving the flexibility of the polymeric product have usually reduced the chemical or heat stability, the solvent resistance and/or the abrasion resistance of the polymeric product. While it is known that certain fluoropolymers show unusual flexibility and toughness, such monomers as tetrafluoroethylene and chlorotrifluoroethylene because of their low boiling points, toxicity and polymerization characteristics are not convenient for introducing internal plasticization by copolymerization. There is a need for new synthetic flexible film-forming materials and tough plastics which are resistant to organic solvents, such as oils and lubricants, and which remain flexible over a wide temperature range. For example, dental prostheses are needed which have high resistance to abrasion and are resilient, tough and insensitive to water and common organic liquids.

The primary object of this invention is the preparation of new and useful copolymers. A further object is the provision of novel copolymers which are flexible over a wide temperature range, readily formed into films or molded shapes, chemically heat-stable, and possess improved solvent and abrasion resistance. Another object is the preparation of valuable copolymers of 2,2,2-trifluoroethyl vinyl ether and an ester of acrylic or methacrylic acids. A still further object of this invention is to provide a commercially feasible process for obtaining copolymers of 2,2,2-trifluoroethyl vinyl ether. Other objects will in part be obvious from, and will in part appear in, the following detailed description.

In accordance with the present invention, these objects are obtained by copolymerizing 2,2,2-trifluoroethyl vinyl ether with a copolymerizable non-halogen containing ester of acrylic or methacrylic acid. The copolymerizable non-halogen containing esters of acrylic or methacrylic acid which are suitable in the practice of this invention include the alkyl acrylates, such a methyl acrylate, ethyl acrylate, propyl acrylate, butyl acrylate, and octyl acrylate; and the alkyl methacrylates, such as methyl methacrylate. This list is merely illustrative. Other esters of acrylic or methacrylic acid, which may be useful, will readily occur to those skilled in the art to which this invention pertains.

The monomer, 2,2,2-trifluoroethyl vinyl ether (herein sometimes referred to simply as trifluoroethyl vinyl ether) can be represented by the following formula:

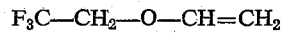

$$F_3C-CH_2-O-CH=CH_2$$

In general, 2,2,2-trifluoroethyl vinyl ether can be prepared by vinylation of 2,2,2-trifluoroethanol with acetylene in the presence of the corresponding alkali metal alcoholate, for example, potassium 2,2,2-trifluoroethanolate. A more detailed description may be found in the copending applications of Julius G. Shukys, Serial Number 290,582, filed May 28, 1952, now abandoned, and Serial Number 357,901, filed May 27, 1953, now Patent No. 2,830,007. It has been found advantageous to use a purified trifluoroethyl vinyl ether in copolymerizations. By the term "purified" trifluoroethyl vinyl ether is meant trifluoroethyl vinyl ether substantially free from alcohol, acetylene, aldehyde, or other polymerization inhibiting materials. The trifluoroethyl vinyl ether may be purified by subjecting it to an acid wash with a mineral acid followed by fractional distillation, as more fully described in Shukys' application, Serial Number 357,901.

The homopolymerization of 2,2,2-trifluoroethyl vinyl ether has been described in applicant's copending application, Serial Number 409,057, filed on February 8, 1954, now Patent No. 2,820,025, of which this application is a continuation-in-part. Trifluoroethyl vinyl ether homopolymerizes to form a high molecular weight, rubberlike, form-stable, non-tacky product only with great difficulty. As more fully described in the aforementioned application, such homopolymers are obtained by cationic polymerizations in the presence of certain activating chlorinated solvents at low temperatures. Entirely unexpectedly, it has now been found that copolymers of 2,2,2-trifluoroethyl vinyl ether and esters of acrylic or methacrylic acid can be prepared smoothly and rapidly, under certain conditions, by free-radical means.

The copolymerizations of 2,2,2-trifluoroethyl vinyl ether with a copolymerizable ester of acrylic or methacrylic acid may be carried out in bulk, solution, suspension or emulsion in the presence of a free-radical supplying initiator. The free-radical supplying initiators used in the practice of this invention may be peroxygen, persulphate or azo compounds. The useful peroxygen compounds include the organic peroxides, such as dibenzoyl peroxide, benzoyl acetyl peroxide, dilauroyl peroxide, diacetyl peroxide, dipropionyl peroxide, benzoyl peroxide and lauroyl peroxide; dialkyl peroxides, such as diethyl peroxide and dipropyl peroxide; organic hydroperoxides, such as tert.-butyl hydroperoxide; inorganic peroxides, such as hydrogen peroxide and alkaline-earth metal peroxides. Suitable persulphate initiators include the sodium, potassium, calcium, barium and ammonium salts of persulphuric acid. Useful azo compound initiators include azo-bis-isobutyronitrile and 1-azo-bis-1-phenylethylene. The free-radical supplying initiator should be employed in an amount of 0.001% to 5% by weight of the combined weight of the monomers and preferably there is employed between 0.01% and 1% by weight of the combined weight of the monomers. The exact quantity of initiator will depend upon the particular monomers and the initiator being employed.

Excess quantities of oxygen should be eliminated from the reaction sphere. This may be accomplished by purging the reaction vessel prior to copolymerization with an inert gas, such as nitrogen, carbon dioxide, the rare gases, such as argon, or mixtures thereof; and conducting the reaction in a substantially inert atmosphere, e.g. in an atmosphere of an inert gas or in a vacuum.

The copolymerizations when carried out in a nonsolvent for the monomers, such as water, may be dispersed therein by using surface-active agents. Such surface-active agents may include the anionic agents such as the alkali metal sulfates and sulfonates, including sodium lauryl sulfate, the sodium salt of the sulphonic acid of dioctyl succinic ester (Aerosol O.T.), alkyl aryl sulphonates, such as dodecyl benzene sulfonate (Santomerse), and the like. Hydrophilic colloids such as gum arabic, completely or partially hydrolyzed polyvinyl alcohol, gelatin, gum tragacanth, hydroxyethyl cellulose, carboxymethyl cellulose, etc., may be used in conjunction with or in place of the surface-active agent.

Activating agents may be used in combination with the free-radical supplying initiator. Such activators include water-soluble reducing agents, such as sodium bisulfite, sodium hydrosulfite, ferrous compounds and sulfoxylates, such as sodium or zinc formaldehyde sulfoxylates. Other activators which can be used are the amine-type activators, such as triethanolamine, dimethyl aniline or triethylene tetramine. These activators normally are employed in concentrations equal to or lesser than the concentration of the free-radical supplying initiator employed.

The temperatures and pressures used for the copolymerization will depend, in part, upon the nature of the acrylic or methacrylic acid ester to be copolymerized with trifluoroethyl vinyl ether, and the molecular weight of the copolymer desired. The temperature may vary between 0° C. to 150° C., although temperatures of from 40–100° C. are preferred. Usually, elevated pressures are not necessary.

The time of copolymerization will depend upon a variety of factors including such factors as the acrylic or methacrylic acid ester used, the temperature of the copolymerization and the amount and type of the free-radical supplying initiator and accelerator employed. Generally, the copolymerization time is between 1–50 hours, and usually between about 2–15 hours.

The copolymers of this invention can contain variable amounts of each comonomer. For example, the copolymers can contain 5 to 95% by weight of trifluoroethyl vinyl ether and from 95 to 5% by weight of the acrylic or methacrylic acid ester. However, those copolymers containing from 5 to 50% by weight trifluoroethyl vinyl ether units are preferred for technological as well as economic reasons. Technologically, favorable reaction rates and copolymers of high viscosity, good chemical stability, and free from discoloration can be obtained with less than equal molar proportions of trifluoroethyl vinyl ether. It has also been found that the molar proportion of trifluoroethyl vinyl ether entering the copolymer is lower than that in the mixture of monomers. This fact is favorable for the production of homogeneous products containing a minor proportion of trifluoroethyl vinyl ether units as internal plasticizer. Any unreacted trifluoroethyl vinyl ether can be readily recovered. Furthermore, advantageous rates of reaction are obtained when the molar proportion of trifluoroethyl vinyl ether in the copolymer is minor.

The copolymers of this invention unexpectedly possess high intrinsic viscosities or molecular weights. This is particularly surprising since the non-trifluoromethyl-containing alkyl vinyl ethers in copolymerization with most olefinic monomers depress greatly the degree of polymerization and intrinsic viscosity of copolymers formed. Furthermore, trifluoroethyl vinyl ether is surprisingly stable to hydrolysis even in aqueous acid conditions, whereas the non-trifluoromethyl-containing alkyl vinyl ethers hydrolyze too quickly to permit satisfactory copolymerization. The stability of trifluoroethyl vinyl ether to hydrolysis is particularly important since acid conditions often are desirable, for example, in aqueous emulsion, in order to give more stable copolymer latices. Further, copolymerization of trifluoroethyl vinyl ether can also be carried out with acidic comonomers. Trifluoroethyl vinyl ether has another additional advantage as a comonomer. Since trifluoroethyl vinyl ether does not homopolymerize by free-radical methods, the copolymers obtained therefrom are more homogeneous.

The copolymer rubbers prepared in accordance with this invention may be cured or vulcanized by conventional methods such as used with polymers of butadiene and chloroprene. For example, treatment of the copolymer with sulfur, sulfur-containing compounds, or magnesium or zinc oxides may result in crosslinking of the copolymer. The properties of the copolymer may also be modified by incorporating a small proportion, e.g. less than 10%, of a bifunctional monomer into the reaction mixture, and conducting the copolymerization under conditions designed to give fusible partial copolymers containing residual reactive double bonds. Such bifunctional monomers include vinyl acrylate, allyl methacrylate, diallyl maleate, diallyl benzene phosphonate, triallyl cyanurate, trimethallyl phosphite and their fluorine derivatives. Conjugated dienes are not considered as belonging to this group. The various techniques for modifying the properties of copolymer and polymer products are well known to the art.

The following examples will serve to illustrate more clearly the preparation of the novel copolymers of this invention. It is to be understood that these examples are not to be considered limitative of the scope of the invention. The parts given are parts by weight.

EXAMPLE I

*Copolymers of 2,2,2-trifluoroethyl vinyl ether and n-butyl acrylate*

11.0 grams of a mixture containing 19.2 grams of butyl acrylate, 6.3 grams of 2,2,2-trifluoroethyl vinyl ether, and 0.26 gram of lauroyl peroxide was charged into a Pyrex glass tube. The tube was purged with nitrogen and sealed under vacuum. The reaction mixture was heated for 6 hours at 50°–55° C. The tube was then opened. The copolymer dissolved in a 5% acetone solution to give a high-viscosity solution, indicating that the copolymer was of high molecular weight. The copolymer was precipitated by adding a 1:1 mixture of methanol-water to the acetone solution. The copolymer was dried under vacuum at 50° C. Yield: 9.1 g. Conversion to copolymer: 83%. The copolymer was a rubbery, elastic, somewhat tacky clear colorless solid. The monomer mixture contained 25 mol percent trifluoroethyl vinyl ether; and the copolymer contained, on analysis, 12.7 mol percent trifluoroethyl vinyl ether.

The copolymer was surprisingly stable to heating and showed no tendency to evolve hydrogen halide when heated, as do most other halogen-containing polymers. A portion of the copolymer was not dissolved after heating an hour at 150° C. in air and only a trace of yellow color resulted from heating a further hour at 200° C. After cooling the tack and rubbery qualities of the copolymer were unchanged. No free acid could be detected by water extraction or indicator paper.

EXAMPLE II

*Copolymers of 2,2,2-trifluoroethyl vinyl ether and methyl methacrylate*

A mixture containing 15.0 g. of methyl methacrylate, 6.3 g. of 2,2,2-trifluoroethyl vinyl ether, and 0.21 gram of lauroyl peroxide were charged into a Pyrex glass tube. The tube was purged with nitrogen and sealed under vacuum. The mixture was heated for 6 hours at 50°–55° C. The copolymer dissolved in a 5% acetone solution to give a very high viscosity solution indicating a high molecular weight. A clear, colorless solid precipitated upon the addition of 100 ml. of methanol. The copolymer was dried under vacuum at 50° C. Yield: 6.5 g. Conversion: 64%. The monomer mixture contained 25 mol percent trifluoroethyl vinyl ether; and the copolymer contained 6.2 mol percent trifluoroethyl vinyl ether.

The copolymer was tough and impact resistant. It was outstanding in chemical stability and form stability on heating. A portion of the copolymer was heated an hour at 150° C. in air; after cooling it remained white, unchanged in shape and did not adhere to the glass beaker. It was then heated an hour at 200° C. in air with the same result except that a cream color was acquired. The copolymer may be useful for dental fillings and other prostheses and can be applied for these purposes by any of the known method, e.g. the monomer-polymer dough technique.

The viscosities of solutions of the copolymers prepared above were determined. Although there are no strict limits, in my experience polymers having viscosities, $$\frac{\eta\ sp}{C}$$

below about 0.2 are regarded as below the range of high polymers. However, the viscosity values are not strictly indicative of molecular weight, especially since the different comonomer units are not equally solvated in the solvent used, methyl ethyl ketone. All of the copolymers dissolved completely, indicating that no crosslinking was evident. An Ostwald-Fenske tube marked Fisher 100/#114, having a flow time of 37.0 seconds for methyl ethyl ketone was used for the viscosity determinations set forth below in Table I. The determinations were made at a temperature of 25° C.

TABLE I

| Copolymer | Conc. in g./100 ml. MEK [1] | Flow Time of Solution (Secs.) | $\frac{\eta\ sp}{C}$ |
|---|---|---|---|
| Methyl Methacrylate—TFEVE [2] | 0.53 | 245<br>246 | 10.6 |
| Butyl Acrylate—TFEVE [2] | 0.50 | 91.6<br>91.6 | 3.0 |

[1] MEK=methyl ethyl ketone.
[2] TFEVE=2,2,2-trifluoroethyl vinyl ether.

The copolymer products of this invention are adapted to a variety of uses. They can be fabricated, as by molding or extrusion, into various shaped articles showing outstanding resistance to impact, abrasion and solvents. The copolymers may be applied by coating extrusion and the like to provide water and corrosion resistant, impervious films or finishes. It may be desirable for certain applications to incorporate various plasticizers, fillers, stabilizers, pigments, or other resins into the copolymer compositions.

It is to be understood that many variations can be made without departing from the scope of this invention. The invention is not to be limited except as defined in the appended claims.

What is claimed is:

1. A binary copolymer containing from 5 to 50 percent by weight of said copolymer of 2,2,2-trifluoroethyl vinyl ether and from 95 to 50 percent by weight of said copolymer of an alkyl ester of an unsaturated acid selected from the group consisting of acrylic and methacrylic acid.

2. A binary copolymer as defined in claim 1, wherein said ester is n-butyl acrylate.

3. A binary copolymer as defined in claim 1, wherein said ester is methyl methacrylate.

4. A process for preparing binary copolymers of 2,2,2-trifluoroethyl vinyl ether and an alkyl ester of an unsaturated acid selected from the group consisting of acrylic and methacrylic acid which comprises reacting a monomer mixture consisting of the said monomers, wherein said ether is in an amount of from 5 to 95 percent by weight of the combined monomer weight in the presence of a free-radical supplying copolymerization initiator.

5. A process as defined in claim 4, wherein the copolymerization temperature is in a range of from about 0° C. to about 100° C.

6. A process as defined in claim 4, wherein said ester is n-butyl acrylate.

7. A process as defined in claim 4, wherein said ester is methyl methacrylate.

8. A process of preparing binary copolymers of 2,2,2-trifluoroethyl vinyl ether and an alkyl ester of an unsaturated acid, said acid being selected from the group consisting of acrylic and methacrylic acid, which comprises dispersing a monomer mixture consisting of the said monomers, wherein said ether is in an amount of from 5 to 50 percent by weight of the combined monomer weight and said ester in an amount of from 95 to 50 percent by weight of the combined monomer weight in an aqueous medium, reacting said monomers in the presence of a free-radical supplying copolymerization initiator at a temperature of from about 40° C. to about 70° C., and recovering the unreacted 2,2,2-trifluoroethyl vinyl ether.

9. A binary copolymer containing from 5 to 95 percent by weight of said copolymer of 2,2,2-trifluoroethyl vinyl ether and from 95 to 5 percent by weight of said copolymer of an alkyl ester of an unsaturated acid selected from the group consisting of acrylic and methacrylic acid.

10. A binary copolymer containing from 5 to 50 percent by weight of said copolymer of 2,2,2-trifluoroethyl vinyl ether and from 95 to 50 percent by weight of said copolymer of an alkyl ester of an unsaturated acid selected from the group consisting of acrylic and methacrylic acids, the alkyl group of said ester containing from 1 to 8 carbon atoms.

References Cited in the file of this patent
UNITED STATES PATENTS

| | | |
|---|---|---|
| 2,016,490 | Fikentscher | Oct. 8, 1935 |
| 2,682,527 | Dickey et al. | June 29, 1954 |
| 2,732,370 | Codding | Jan. 24, 1956 |

OTHER REFERENCES

Chemical Abstracts, volume 39, page 5923 (1945).

UNITED STATES PATENT OFFICE
CERTIFICATE OF CORRECTION

Patent No. 2,991,277              July 4, 1961

Calvin E. Schildknecht

It is hereby certified that error appears in the above numbered patent requiring correction and that the said Letters Patent should read as corrected below.

Column 4, line 61, for "dissolved" read -- discolored --.

Signed and sealed this 21st day of November 1961.

(SEAL)
Attest:

ERNEST W. SWIDER
Attesting Officer

DAVID L. LADD
Commissioner of Patents

USCOMM-DC